(12) United States Patent
Strandborg et al.

(10) Patent No.: US 12,413,697 B2
(45) Date of Patent: Sep. 9, 2025

(54) RE-MAPPING VIRTUAL-REALITY DEPTH BASED ON REAL-WORLD DEPTH

(71) Applicant: Varjo Technologies Oy, Helsinki (FI)

(72) Inventors: Mikko Strandborg, Helsinki (FI); Antti Hirvonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 192 days.

(21) Appl. No.: 18/449,444

(22) Filed: Aug. 14, 2023

(65) Prior Publication Data

US 2025/0063152 A1    Feb. 20, 2025

(51) Int. Cl.
*H04N 13/271* (2018.01)
*G06T 7/50* (2017.01)
*G06T 19/00* (2011.01)

(52) U.S. Cl.
CPC .............. *H04N 13/271* (2018.05); *G06T 7/50* (2017.01); *G06T 19/006* (2013.01); *G06T 2207/10028* (2013.01)

(58) Field of Classification Search
CPC ....... G06T 7/50; G06T 19/003; G06T 19/006; H04N 13/271
See application file for complete search history.

(56) References Cited

U.S. PATENT DOCUMENTS

| | | | |
|---|---|---|---|
| 12,154,231 B2* | 11/2024 | Banerjee | G06T 5/50 |
| 2018/0036641 A1* | 2/2018 | Parisi | A63F 13/216 |
| 2019/0251749 A1* | 8/2019 | Rhodes, Jr. | G06T 19/20 |
| 2019/0306489 A1* | 10/2019 | Cheng | G06V 20/64 |

* cited by examiner

*Primary Examiner* — Charles Tseng
(74) *Attorney, Agent, or Firm* — ZIEGLER IP LAW GROUP, LLC.

(57) ABSTRACT

A real-world depth map is obtained corresponding to a viewpoint from a perspective of which a virtual-reality (VR) depth map has been generated. For a given pixel in the VR depth map, an optical depth (D) of a corresponding pixel in the real-world depth map is found. A lower bound (D−D1) for the given pixel is determined by subtracting a first predefined value (D1) from the optical depth (D) of the corresponding pixel in the real-world depth map. An upper bound (D+D2) for the given pixel is determined by adding a second predefined value (D2) to the optical depth (D) of the corresponding pixel in the real-world depth map. An optical depth of the given pixel fetched from the VR depth image is re-mapped, from a scale of the lower bound to the upper bound determined for the given pixel to another scale of A to B, wherein A and B are scalars. Re-mapped optical depths of pixels of the VR depth map are then encoded into an encoded depth map. This encoded depth map is sent to at least one display apparatus.

15 Claims, 3 Drawing Sheets

RE-MAPPING VIRTUAL-REALITY DEPTH BASED ON REAL-WORLD DEPTH

TECHNICAL FIELD

The present disclosure relates to methods and systems for encoding, incorporating re-mapping of virtual-reality optical depths based on real-world optical depths. The present disclosure relates to methods for decoding, incorporating reverse-mapping of re-mapped virtual-reality optical depths based on real-world optical depths.

BACKGROUND

In remote-rendered extended-reality (XR) use cases, a virtual-reality (VR) depth map rendered by an XR rendering application needs to be transported over to a client (namely, a display apparatus), in order for the client to perform occlusion testing against real-world optical depths. Each VR pixel has a corresponding optical depth. A compositor of the client compares the optical depth of the VR pixel against the optical depth of a corresponding real-world pixel, to determine which one of the VR pixel and the real-world pixel occludes another of the VR pixel and the real-world pixel. The one of the VR pixel and the real-world pixel is then displayed instead of the another.

In order to reduce network traffic, the VR depth map is compressed using a lossy video compression algorithm, for example, such as HEVC. Due to power consumption and performance limitations, only video codecs that have hardware acceleration for both encoding and decoding are feasible to use; therefore, no custom compression schemes are realistic. Like most other video codecs, HEVC uses a psychovisual compression model, which means that the codec attempts to identify features in a VR image that are more visible to a human eye, and concentrates on transporting those features reliably at the cost of other features in the VR image. In practice, this means that depth maps do not survive lossy compression very well, for example, due to a fact that most near-black pixels (namely, pixels whose optical depths are very close to a viewer) will get compressed to 0; as a result, re-creation accuracy of optical depths near 0 is not good at all.

Another problem is that as HEVC is a codec for colour surfaces, it only takes colour values between 0.0 and 1.0 as input; values outside that range are not supported. This means that the VR depth map must be encoded so that all optical depths lie in a range of 0 to 1. A naïve encoding would be to just remap a given range of optical depths (for example, between 0 metre and 5 metre) in the VR depth map to the range of 0 to 1. For an 8-bit encoding, this would mean that there are 256 possible discrete distances for the VR optical depth, implying an effective resolution of approximately 1.9 centimetre (cm) only. For a 10-bit encoding, the effective resolution would be approximately 0.5 cm. While this may probably be enough for a single pixel, object surfaces typically have smooth gradients and those will appear blocky and uneven at such resolutions.

One possible method for improving this would be to divide the VR depth map into tiles of a fixed size, for example 32×32 pixels, calculate a minimum optical depth and a maximum optical depth for each tile separately, and remap the optical depths of pixels within said tile to the range of 0 to 1; that is, use the same 8-bit encoding for a smaller area having a smaller dynamic range of values. The minimum optical depth and the maximum optical depth for each tile can then be transported separately to the client. While this method provides more accuracy in tiles where the optical depths are relatively similar, the original problem of insufficient resolution still remains on tiles that contain depth discontinuities, especially in cases where there is some foreground VR content with a depth edge and the rest of the tile is empty (namely, has large optical depth).

Therefore, in light of the foregoing discussion, there exists a need to overcome the aforementioned drawbacks.

SUMMARY

The aim of the present disclosure is to provide a method and a system for encoding that are capable of encoding a virtual-reality (VR) depth map using a reduced number of bits, yet in an accurate manner, as well as a corresponding method for decoding. The aim of the present disclosure is achieved by a method and a system in which actual optical depths of pixels of the VR depth map are re-mapped from one scale to another scale based on optical depths of corresponding pixels of a real-world depth map, prior to encoding, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
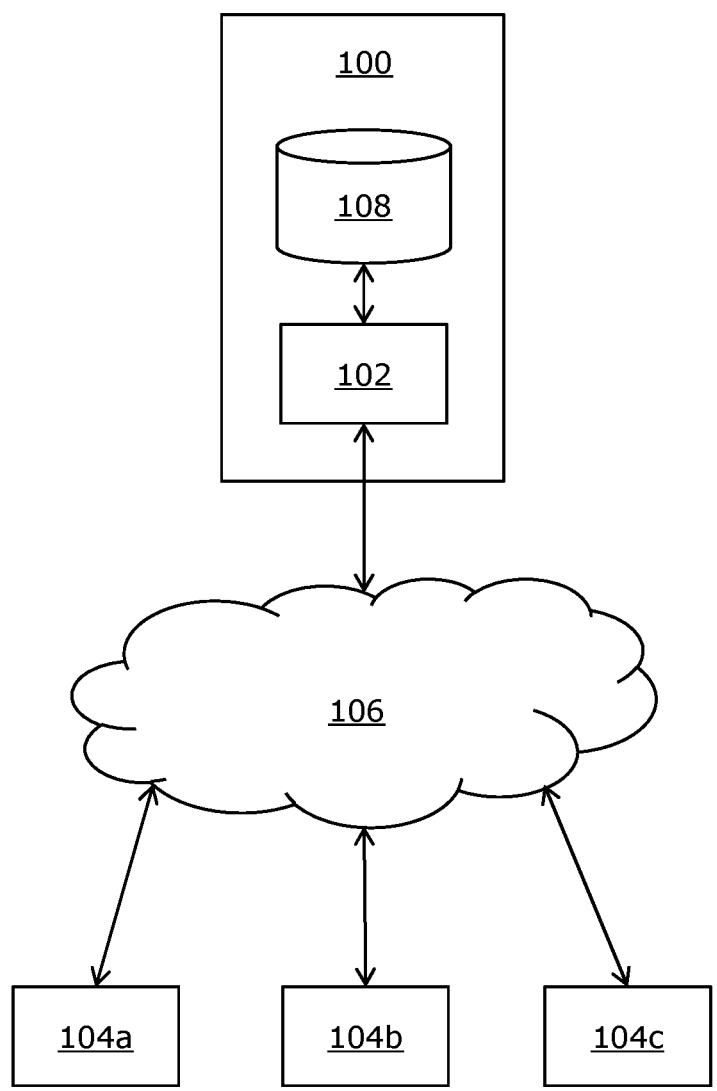
FIG. 1 illustrates a schematic diagram of a network environment in which a system for encoding and at least one display apparatus can be implemented, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method for encoding, implemented by at least one server that is communicably coupled to at least one display apparatus, the method comprising:

obtaining a real-world depth map corresponding to a viewpoint from a perspective of which a virtual-reality (VR) depth map has been generated;

for a given pixel in the VR depth map, finding an optical depth (D) of a corresponding pixel in the real-world depth map;

determining a lower bound (D−D1) for the given pixel, by subtracting a first predefined value (D1) from the optical depth (D) of the corresponding pixel in the real-world depth map;

determining an upper bound (D+D2) for the given pixel, by adding a second predefined value (D2) to the optical depth (D) of the corresponding pixel in the real-world depth map;

re-mapping an optical depth of the given pixel fetched from the VR depth image, from a scale of the lower bound to the upper bound determined for the given pixel to another scale of A to B, wherein A and B are scalars;

encoding re-mapped optical depths of pixels of the VR depth map into an encoded depth map; and sending the encoded depth map to the at least one display apparatus.

In a second aspect, an embodiment of the present disclosure provides a system for encoding, comprising at least one server that is communicably coupled to at least one display apparatus, the at least one server being configured to:

obtain a real-world depth map corresponding to a viewpoint from a perspective of which a virtual-reality (VR) depth map has been generated;

for a given pixel in the VR depth map, find an optical depth (D) of a corresponding pixel in the real-world depth map;

determine a lower bound (D−D1) for the given pixel, by subtracting a first predefined value (D1) from the optical depth (D) of the corresponding pixel in the real-world depth map;

determine an upper bound (D+D2) for the given pixel, by adding a second predefined value (D2) to the optical depth (D) of the corresponding pixel in the real-world depth map;

re-map an optical depth of the given pixel fetched from the VR depth image, from a scale of the lower bound to the upper bound determined for the given pixel to another scale of A to B, wherein A and B are scalars;

encode re-mapped optical depths of pixels of the VR depth map into an encoded depth map; and send the encoded depth map to the at least one display apparatus.

In a third aspect, an embodiment of the present disclosure provides a method for decoding, implemented by at least one display apparatus, the method comprising:

receiving an encoded depth map from at least one server;

decoding the encoded depth map into re-mapped optical depths of pixels of a virtual-reality (VR) depth map;

obtaining a real-world depth map corresponding to a viewpoint from a perspective of which the VR depth map has been generated;

for a given pixel in the VR depth map, finding an optical depth (D) of a corresponding pixel in the real-world depth map;

determining a lower bound (D−D1) for the given pixel, by subtracting a first predefined value (D1) from the optical depth (D) of the corresponding pixel in the real-world depth map;

determining an upper bound (D+D2) for the given pixel, by adding a second predefined value (D2) to the optical depth (D) of the corresponding pixel in the real-world depth map;

reverse-mapping a re-mapped optical depth of the given pixel of the VR depth map, from a scale of A to B to another scale of the lower bound to the upper bound determined for the given pixel, wherein A and B are scalars; and determining, based on the optical depth of the corresponding pixel of the real-world depth map and the another scale of the lower bound to the upper bound, at least one of: an optical depth of the given pixel of the VR depth map, whether the given pixel occludes or is occluded by the corresponding pixel.

Pursuant to the present disclosure, instead of encoding actual optical depths of pixels of the VR depth map (namely, optical depths of the pixels as fetched from the VR depth map), re-mapped optical depths of the pixels of the VR depth map are encoded and sent to the at least one display apparatus. The aforesaid re-mapping for the given pixel of the VR depth map is performed by employing the lower bound and the upper bound, which are determined based on the (actual) optical depth of the corresponding pixel in the real-world depth map. Notably, the lower bound and the upper bound are determined on a per-pixel basis. This means that the lower bound and the upper bound employed for one pixel of the VR depth map may be quite different from the lower bound and the upper bound employed for another pixel of the VR depth map, because optical depths of their corresponding pixels in the real-world depth map were quite different.

By re-mapping the actual optical depth of the given pixel of the VR depth map from the scale of the lower bound to the upper bound to the another scale of A to B (namely, scalars), a technical benefit is achieved with respect to a reduced number of bits that are required to encode the re-mapped optical depth (as compared to a number of bits that would have been required to encode the actual optical depth), whilst improving accuracy. This is because actual optical depths of different pixels across the VR depth map could typically lie in a vast range, which is often impossible to re-create exactly and accurately upon subsequent decoding of the encoded depth map at the at least one display apparatus, due to a limit on a total number of bits that can be employed for a lossy encoding. On the other hand, the another scale of A to B facilitates a much smaller range for the re-mapped optical depths of the pixels of the VR depth map as compared to the vast range for the actual optical depths of these pixels, thereby allowing for more accurate re-creation of the optical depths of the pixels of the VR depth map at the at least one display apparatus, whilst drastically reducing the number of bits required to encode and network delays. The encoded depth map is subsequently decoded by (a compositor of) the at least one display apparatus to determine which one of a VR pixel and a corresponding real-world pixel occludes another one of the VR pixel and the corresponding real-world pixel.

The aforementioned technical benefit arises due to a fact that for purposes of depth comparisons during a composition process to create an extended-reality (XR) image, (the compositor of) the at least one display apparatus needs to know an optical depth of a particular VR pixel (namely, a pixel of a VR image) accurately, only in a case when an optical depth of a corresponding real-world pixel (namely, a corresponding pixel of a real-world image) is approximately similar; in other cases, (the compositor of) the at least one display apparatus only needs to know whether a VR pixel is "further away" from or "closer" to a given pose (from a perspective of which the XR image is to be created) as compared to a corresponding real-world pixel. For purposes of the present disclosure, the term "extended reality" encompasses augmented reality and mixed reality.

There will now be provided details of the steps of the aforementioned method. Hereinabove, the term "given pixel" refers to any pixel from amongst a plurality of pixels of the VR depth map. The steps have been recited with respect to the given pixel, for the sake of clarity only. These steps can be performed in a similar manner for all the pixels of the VR depth map.

Obtaining Real-World Depth Map

The real-world depth map corresponds to the viewpoint from the perspective of which the VR depth map has been generated. The real-world depth map and the VR depth map correspond to a real-world image and a VR image, respectively, wherein the VR depth map and the VR image are rendered based on a given pose. Herein, the term "given pose" refers to a head pose of a user or a device pose being used by the user.

The term "pose" encompasses both position and orientation. The given pose could be a current pose or a predicted pose. It will be appreciated that in XR applications, pose information indicative of the pose could be obtained from the at least one display apparatus. The pose may be tracked at the at least one display apparatus by employing a pose-tracking means. The pose-tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Such pose-tracking means are well known in the art.

The real-world image could, for example, be captured using a video-see-through (VST) camera of a head-mounted display (HMD) device. In such implementations, the at least one display apparatus could be implemented as the HMD itself or as a combination of the HMD and a computing device that is communicably coupled to the HMD. The term "head-mounted display" device refers to a display device that is employed to present an XR environment to the user when said HMD device, in operation, is worn by the user on his/her head. The HMD device can be implemented, for example, as an XR headset, a pair of XR glasses, and the like, that is operable to display a visual scene of the XR environment to the user.

The real-world depth map could be obtained in various ways. As an example, the real-world depth map could be obtained by reprojecting a previous real-world depth map that was received previously from the at least one display apparatus. Such a reprojection can be performed by employing a three degrees-of-freedom (3DOF) reprojection. At the at least one display apparatus, the aforesaid re-mapping of the optical depths of the pixels of the VR depth map can be trivially reversed by reprojecting the previous real-world depth map to the given pose.

As another example, the real-world depth map could be obtained by receiving the real-world depth map in real-time or near real-time from the at least one display apparatus. In both the aforementioned examples, the real-world depth map can be captured by employing a depth camera of the at least one display apparatus. Examples of the depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. In some implementations, a single camera (that is implemented as a combination of a visible-light camera and a depth camera) can be employed to capture the real-world image and the real-world depth map.

As yet another example, the real-world depth map could be obtained by using a three-dimensional (3D) model of the real-world environment that was previously created based on images and corresponding depth maps received from, for example, the HMD, the computing device or a teleport device. The term "3D model" of the real-world environment refers to a data structure that comprises comprehensive information pertaining to objects or their parts present in the real-world environment. Such comprehensive information is indicative of at least one of: surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within the real-world environment.

Optionally, the system further comprises at least one data repository. The at least one server could be configured to store the 3D model at the at least one data repository. The at least one data repository could be implemented, for example, such as a memory of the at least one server, a memory of the computing device, a removable memory, a cloud-based database, or similar. It will be appreciated that the at least one server can be implemented as a cloud server, or the computing device that is communicably coupled to the HMD.

It will be appreciated that the various ways of obtaining the real-world depth map could also be used in any combination.

Finding Optical Depth (D) of Corresponding Pixel in Real-World Depth Map

The corresponding pixel in the real-world depth map can be determined by mapping position coordinates of the given pixel of the VR depth map with position coordinates of the corresponding pixel of the real-world depth map. Such mapping of position coordinates can be performed irrespective of whether a resolution (namely, pixel density or pixels per degree) of the VR depth map is same as or different from a resolution of the real-world depth map. This can be performed trivially by employing well-known techniques in the art. Upon determining the corresponding pixel in the real-world depth map, the optical depth (D) of the corresponding pixel can be fetched from the real-world depth map.

Determining Lower Bound (D−D1) and Upper Bound (D+D2) for Given Pixel

As mentioned earlier, the lower bound and the upper bound are determined on a per-pixel basis. In other words, the lower bound and the upper bound are determined based on the (actual) optical depth of the corresponding pixel in the real-world depth map. In most cases, the lower bound and the upper bound employed for different pixels of the VR depth map vary across the VR depth map, because optical depths of their corresponding pixels in the real-world depth map were quite different.

The lower bound (D−D1) is determined by subtracting the first predefined value (D1) from the optical depth (D) of the corresponding pixel in the real-world depth map, while the upper bound (D+D2) is determined by adding the second predefined value (D2) to the optical depth (D) of the corresponding pixel in the real-world depth map. The first predefined value (D1) may be same as or different from the second predefined value (D2).

As a first example, there will now be considered a case where both the first predefined value (D1) and the second predefined value (D2) are equal to 20 cm, and the optical depth (D) of the corresponding pixel in the real-world depth map is equal to 50 cm. In the first example, the lower bound (D−D1) and the upper bound (D+D2) would be equal to 30 cm and 70 cm, respectively.

As a second example, there will now be considered another case where the first predefined value (D1) and the second predefined value (D2) are equal to 50 cm and 20 cm, respectively, and the optical depth (D) of the corresponding pixel in the real-world depth map is equal to 50 cm. In the second example, the lower bound (D−D1) and the upper bound (D+D2) would be equal to 0 cm and 70 cm, respectively.

It will be appreciated that the first predefined value (D1) and the second predefined value (D2) need not be the same for all the pixels of the VR depth map, and different values of the first predefined value (D1) and the second predefined value (D2) could be employed. As an example, smaller values of the first predefined value (D1) and the second predefined value (D2) could be employed for cases where optical depths of corresponding pixels in the real-world depth map are smaller than a predefined threshold optical depth, as compared to other cases where optical depths of corresponding pixels in the real-world depth map are greater than the predefined threshold optical depth. The predefined threshold optical depth may be selected from a range of 150 cm to 200 cm. This may potentially improve accuracy of the encoding. This technical benefit arises from a fact that in most cases, smaller optical depths are beneficial to be segmented into greater number of steps as compared to greater optical depths (which may easily go up to infinity). Moreover, an accuracy of optical depth as captured in the real-world depth map decreases for large distances (for example, distances greater than 200 cm) that go up to infinity; this could be due to inherent limitations of conventional equipment (for example, such as an IR camera, ToF camera, a stereo camera, or similar).

Re-Mapping Optical Depth

The optical depth of the given pixel (as fetched from the VR depth image) could be re-mapped, from the scale of the lower bound to the upper bound (determined for the given pixel) to the another scale of A to B, by employing normalization. Normalization techniques are well-known in the art. Optionally, in this regard, the optical depth of the given pixel is re-mapped to:

B, if the optical depth of the given pixel is larger than the upper bound,

A, if the optical depth is smaller than the lower bound.

As mentioned earlier, A and B are scalars; this means that A and B are real numbers. The scalars A and B can beneficially be selected depending on the number of bits that are to be employed to encode the re-mapped optical depths. As an example, the another scale of A to B can be selected as a scale of 0 to 1, 0 to 10, or similar. As another example, the another scale of A to B can be selected as a scale of 0 to 255. As yet another example, the another scale of A to B can be selected as a scale of −127 to +127.

Continuing from the aforementioned first example where the optical depth (D) of the corresponding pixel in the real-world depth map is equal to 50 cm, and the lower bound (D−D1) and the upper bound (D+D2) are equal to 30 cm and 70 cm, respectively. In such a case, if the optical depth of the given pixel of the VR depth map were 40 cm and the another scale of A to B were selected as a scale of 0 to 100, the optical depth of the given pixel of the VR depth map could be re-mapped from 40 cm (namely, from the scale of 30 cm to 70 cm) to a scalar '25' (namely, to the another scale of 0 to 100).

Continuing from the aforementioned second example where the optical depth (D) of the corresponding pixel in the real-world depth map is equal to 50 cm, and the lower bound (D−D1) and the upper bound (D+D2) are equal to 0 cm and 70 cm, respectively. In such a case, if the optical depth of the given pixel of the VR depth map were 40 cm and the another scale of A to B were selected as a scale of 0 to 100, the optical depth of the given pixel of the VR depth map could be re-mapped from 40 cm (namely, from the scale of 0 cm to 70 cm) to a scalar '57' (namely, to the another scale of 0 to 100).

Moreover, optionally, the optical depth of the given pixel is re-mapped in a non-linear manner. In other words, the re-mapping can be performed by employing a non-linear normalization technique. Optionally, in this regard, if a transport channel employed for encoding the re-mapped optical depths enables representing the optical depths in N discrete steps, a size of a discrete step that is in a proximity of the optical depth (D) of the corresponding pixel in the real-world depth map is smaller than a size of another discrete step that is in a proximity of the lower bound or the upper bound. A technical benefit of such non-linear re-mapping is that the optical depth of the given pixel of the VR depth map can be re-created more accurately at the at least one display apparatus, even in a case where the optical depth of the given pixel of the VR depth map is almost similar to (that is, lies in the proximity of) the optical depth of the corresponding pixel of the real-world depth map. This takes into consideration a fact that lossy encoding could encode slightly different re-mapped optical depths also to a same encoded value.

For illustration purposes, there will now be considered an example, wherein:

(i) the optical depth (D) of the corresponding pixel in the real-world depth map is equal to 100 cm;
(ii) the lower bound (D−D1) and the upper bound (D+D2) are equal to 50 cm and 150 cm, respectively;
(iii) the optical depth of the given pixel of the VR depth map is equal to 95 cm, and
(iv) the another scale of A to B is selected as a scale of −127 to +127, wherein the transport channel is capable of representing the optical depths in 256 discrete steps.

In the above example, if a linear normalization technique were employed, the optical depth of the given pixel of the VR depth map could be re-mapped from 95 cm (namely, from the scale of 50 cm and 150 cm) to a scalar '−13' (namely, to the another scale of −127 to +127). However, if a non-linear normalization technique were employed, wherein the discrete steps of the scale of −127 to +127 are divided in a manner that steps in the proximity of the optical depth (D) of the corresponding pixel in the real-world depth map are smaller than other steps that are in the proximity of the lower bound or the upper bound, the optical depth of the given pixel of the VR depth map could be re-mapped from 95 cm to, for example, a scalar '−39'.

Optionally, the first predefined value (D1) is increased to adjust the lower bound. Such an adjustment can be beneficially performed during non-linear re-mapping, to decrease the lower bound. This can be achieved by selecting the first predefined value (D1) that is larger than the second predefined value (D2). Decreasing the lower bound improves the scale of the lower bound to the upper bound, because it brings the lower bound closer to a viewer. A technical benefit of adjusting the lower bound in such a manner is that it allows for extending an effective range of the transport channel further towards the viewer, whilst allowing for coarser steps further away from the optical depth of the corresponding pixel of the real-world depth map.

Furthermore, optionally, values lying between X and Y are left unutilised within the another scale of A to B during the step of re-mapping, wherein X and Y are scalars, wherein:

when the optical depth of the given pixel is smaller than and within a third predefined range from the optical depth (D) of the corresponding pixel in the real-world depth map, the optical depth of the given pixel is re-mapped to X, when the optical depth of the given pixel is larger than and within a fourth predefined range from the optical depth (D) of the corresponding pixel in the real-world depth map, the optical depth of the given pixel is re-mapped to Y.

In this regard, a relationship between X, Y, A and B can be indicated mathematically as follows:

$$A < X < Y < B$$

The third predefined range and the second predefined range can be selected depending on the another scale of A to B.

Leaving the values lying between X and Y unutilised within the another scale of A to B during re-mapping has clear technical benefits. This will now be illustrated using an example where:

(i) the optical depth of the corresponding pixel of the real-world depth map is 100 cm;

(ii) the lower bound and the upper bound are equal to 50 cm and 150 cm, respectively; and (iii) the another scale of A to B is selected as a scale of −127 to +127.

In such an example, if a linear normalization technique were employed, a value '0' in the scale of −127 to +127 would correspond to the optical depth of the corresponding pixel of the real-world depth map (namely, to 100 cm). If the optical depth of the given pixel of the VR depth map is 99 cm (that is, the VR pixel is just occluding the real-world pixel), it would be re-mapped to a scalar '−3' (in the scale of −127 to +127). On the other hand, if the optical depth of the given pixel of the VR depth map is 101 cm (that is, the real-world pixel is just occluding the VR pixel), it would be re-mapped to a scalar '+3' (in the scale of −127 to +127). This leaves scope for errors in re-creating the optical depth of the VR pixel at the at least one display apparatus, because lossy encoding often encodes a near-zero value to zero. This, in turn, causes errors in identifying boundaries where the real-world depth intersects with the VR depth.

However, if in the same example, values lying between −32 and +32 are left unutilised within the another scale of −127 to +127, following would happen. If the optical depth of the given pixel of the VR depth map is 99 cm (that is, the VR pixel is just occluding the real-world pixel), it would be re-mapped to a scalar '−34', instead of the scalar '−3'. On the other hand, if the optical depth of the given pixel of the VR depth map is 101 cm (that is, the real-world pixel is just occluding the VR pixel), it would be re-mapped to a scalar '+34', instead of the scalar '+3'.

Thus, the technical benefit of leaving the values lying between X and Y unutilised within the another scale of A to B during re-mapping is that it allows for re-creating the optical depth of the pixels of the VR depth map more accurately, even for pixels where the VR content and the real-world content intersect forming a high-contrast discontinuity. This makes the encoding more robust.

Encoding Re-Mapped Optical Depths

The re-mapped optical depths of the pixels of the VR depth map can be encoded into the encoded depth map by employing well-known encoding techniques. Examples of encoding techniques include, but are not limited, advance video coding (AVC, also known as H.264), high efficiency video coding (HEVC, also known as H.265), versatile video coding (VVC, also known as H.266), AOMedia Video 1 (AV1), and VP9.

Depending on the first predefined value and the second predefined value selected, a majority of the re-mapped optical depths could be equal to either A or B, while a remainder of the re-mapped optical depths could correspond to pixels representing sharp edges at depth discontinuities.

Therefore, the re-mapped optical depths can be encoded well using existing lossy video encoders, even when 8-bit representations are used with low encoding bitrates.

Sending Encoded Depth Map

The encoded depth map can be sent from the at least one server to the at least one display apparatus, for example, via a communication network. Optionally, the at least one server also sends, to the at least one display apparatus, information indicative of the first predefined value and the second predefined value. This allows the at least one display apparatus to reverse the re-mapping, upon decoding the encoded depth map.

Optionally, the encoded depth map is sent via an alpha channel, when A is equal to 0 and B is equal to 1. As alpha values use the same scale of 0 to 1 in the alpha channel, the encoded depth map can be sent via the alpha channel trivially, namely, without any need for modifications to existing alpha channel. This eliminates a need for a separate video stream for sending depth data.

The present disclosure also relates to the system as described above. Various embodiments and variants disclosed above, with respect to the aforementioned method, apply mutatis mutandis to the system.

The present disclosure also relates to the method for decoding as described above. Various embodiments and variants disclosed above, with respect to the aforementioned method for encoding, apply mutatis mutandis to the method for decoding.

Optionally, in the method, the at least one display apparatus also receives, from the at least one server, the information indicative of the first predefined value and the second predefined value. This allows the at least one display apparatus to determine the lower bound and the upper bound, and therefore, perform reverse-mapping on the re-mapped optical depth of the given pixel of the VR depth map. It will be appreciated that this information may be received just once from the at least server, in cases where the first predefined value and the second predefined value do not change across images.

Notably, in most cases, it is sufficient for the at least one display apparatus to determine whether the given pixel occludes or is occluded by the corresponding pixel. The actual optical depth of the given pixel of the VR depth map could be determined for only those pixels whose optical depths are in the proximity of the optical depth of the corresponding pixel of the real-world depth map.

DETAILED DESCRIPTION OF THE DRAWINGS

FIG. 1 illustrates a schematic diagram of a network environment in which a system 100 for encoding and at least one display apparatus can be implemented, in accordance with an embodiment of the present disclosure. The system 100 comprises at least one server (depicted as a server 102) that is communicably coupled to the at least one display apparatus (depicted as display apparatuses 104a-c), for example, via a communication network 106. The system 100 optionally comprises at least one data repository (depicted as a data repository 108) that is communicably coupled to the server 102.

It may be understood by a person skilled in the art that FIG. 1 illustrates a simplified block diagram of the network environment, for sake of clarity, which should not unduly limit the scope of the claims herein. It is to be understood that the specific implementation of the system 100 is provided as an example and is not to be construed as limiting it to specific numbers or types of servers, display apparatuses, communication networks and data repositories. The person skilled in the art will recognize many variations, alternatives, and modifications of embodiments of the present disclosure.

Figure 2:
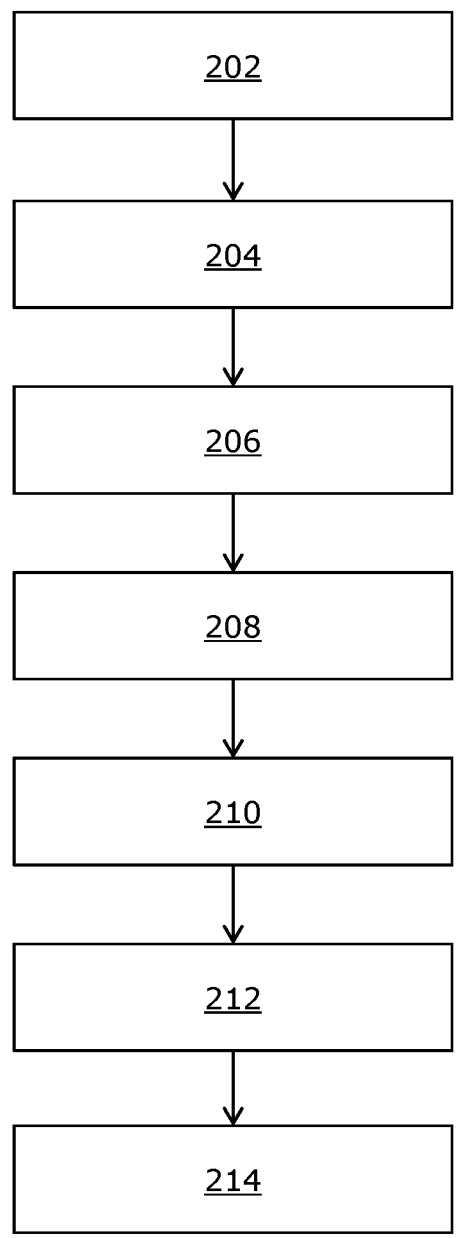
FIG. 2 illustrates steps of a method for encoding, in accordance with an embodiment of the present disclosure.

FIG. 2 illustrates steps of a method for encoding, implemented by at least one server, in accordance with an embodiment of the present disclosure.

At a step 202, a real-world depth map is obtained corresponding to a viewpoint from a perspective of which a VR depth map has been generated. At a step 204, for a given pixel in the VR depth map, an optical depth (D) of a corresponding pixel in the real-world depth map is found. At a step 206, a lower bound (D−D1) for the given pixel is determined by subtracting a first predefined value (D1) from the optical depth (D) of the corresponding pixel in the real-world depth map. At a step 208, an upper bound (D+D2) for the given pixel is determined by adding a second predefined value (D2) to the optical depth (D) of the corresponding pixel in the real-world depth map. At a step 210, an optical depth of the given pixel fetched from the VR depth image is re-mapped, from a scale of the lower bound to the upper bound determined for the given pixel to another scale of A to B, wherein A and B are scalars. At a step 212, re-mapped optical depths of pixels of the VR depth map are then encoded into an encoded depth map. At a step 214, the encoded depth map is sent to at least one display apparatus.

The aforementioned steps are only illustrative and other alternatives can also be provided where one or more steps are added, one or more steps are removed, or one or more steps are provided in a different sequence without departing from the scope of the claims. For example, the steps 206 and 208 can be performed simultaneously.

Figure 3:
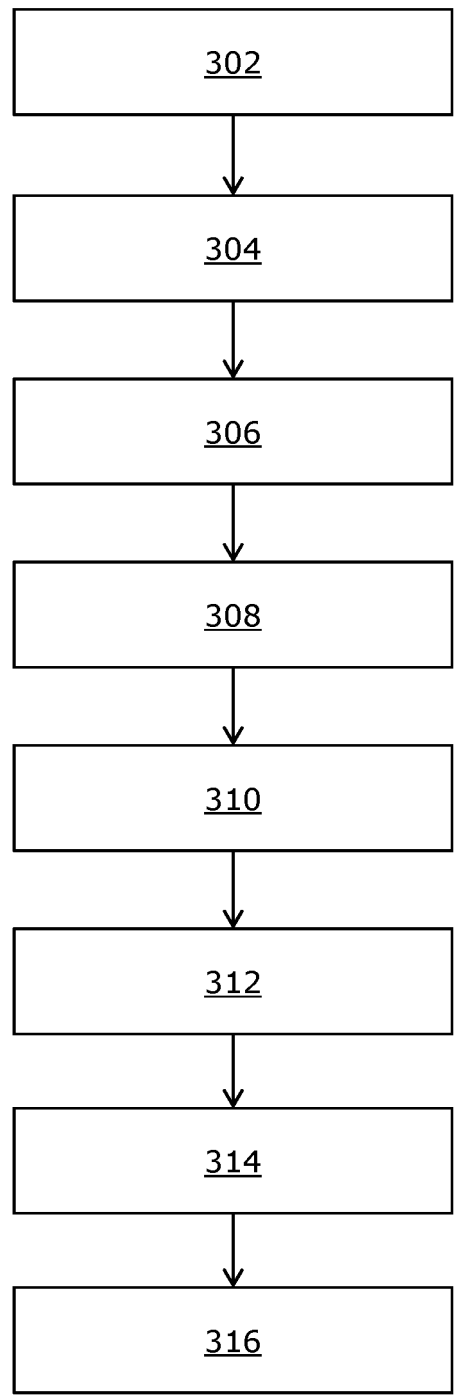
FIG. 3 illustrates steps of a method for decoding, in accordance with an embodiment of the present disclosure.

FIG. 3 illustrates steps of a method for decoding, implemented by at least one display apparatus, in accordance with an embodiment of the present disclosure. At a step 302, an encoded depth map is received from at least one server. At a step 304, the encoded depth map is decoded into re-mapped optical depths of pixels of a VR depth map. At a step 306, a real-world depth map is obtained corresponding to a viewpoint from a perspective of which the VR depth map has been generated. At a step 308, for a given pixel in the VR depth map, an optical depth (D) of a corresponding pixel in the real-world depth map is found. At a step 310, a lower bound (D−D1) is determined for the given pixel, by subtracting a first predefined value (D1) from the optical depth (D) of the corresponding pixel in the real-world depth map. At a step 312, an upper bound (D+D2) is determined for the given pixel, by adding a second predefined value (D2) to the optical depth (D) of the corresponding pixel in the real-world depth map. At a step 314, a re-mapped optical depth of the given pixel of the VR depth map is reverse-mapped, from a scale of A to B to another scale of the lower bound to the upper bound determined for the given pixel, wherein A and B are scalars. At a step 316, based on the optical depth of the corresponding pixel of the real-world depth map and the another scale of the lower bound to the upper bound, there is determined at least one of: an optical depth of the given pixel of the VR depth map, whether the given pixel occludes or is occluded by the corresponding pixel.

The aforementioned steps are only illustrative and other alternatives can also be provided where one or more steps are added, one or more steps are removed, or one or more steps are provided in a different sequence without departing from the scope of the claims. For example, the steps 310 and 312 can be performed simultaneously.

What is claimed is:

1. A method for encoding, implemented by at least one server that is communicably coupled to at least one display apparatus, the method comprising:
    obtaining a real-world depth map corresponding to a viewpoint from a perspective of which a virtual-reality (VR) depth map has been generated;
    for a given pixel in the VR depth map, finding an optical depth (D) of a corresponding pixel in the real-world depth map;
    determining a lower bound (D−D1) for the given pixel, by subtracting a first predefined value (D1) from the optical depth (D) of the corresponding pixel in the real-world depth map;
    determining an upper bound (D+D2) for the given pixel, by adding a second predefined value (D2) to the optical depth (D) of the corresponding pixel in the real-world depth map;
    re-mapping an optical depth of the given pixel fetched from the VR depth map, from a scale of the lower bound to the upper bound determined for the given pixel to another scale of A to B, wherein A and B are scalars;
    encoding re-mapped optical depths of pixels of the VR depth map into an encoded depth map; and
    sending the encoded depth map to the at least one display apparatus.

2. The method of claim 1, wherein the optical depth of the given pixel is re-mapped to:
    B, if the optical depth of the given pixel is larger than the upper bound,
    A, if the optical depth of the given pixel is smaller than the lower bound.

3. The method of claim 1, wherein the optical depth of the given pixel is re-mapped in a non-linear manner.

4. The method of claim 3, wherein if a transport channel employed for encoding the re-mapped optical depths enables representing optical depths in N discrete steps, a size of a discrete step that is in a proximity of the optical depth (D) of the corresponding pixel in the real-world depth map is smaller than a size of another discrete step that is in a proximity of the lower bound or the upper bound.

5. The method of claim 3, wherein the first predefined value (D1) is increased to adjust the lower bound.

6. The method of claim 1, wherein values lying between X and Y are left unutilised within the other scale of A to B during the step of re-mapping, wherein X and Y are scalars, wherein:
    when the optical depth of the given pixel is smaller than and within a third predefined range from the optical depth (D) of the corresponding pixel in the real-world depth map, the optical depth of the given pixel is re-mapped to X, when the optical depth of the given pixel is larger than and within a fourth predefined range from the optical depth (D) of the corresponding pixel in the real-world depth map, the optical depth of the given pixel is re-mapped to Y.

7. The method of claim 1, wherein the encoded depth map is sent via an alpha channel, when A is equal to 0 and B is equal to 1.

8. A system for encoding, comprising at least one server that is communicably coupled to at least one display apparatus, the at least one server being configured to:
   obtain a real-world depth map corresponding to a viewpoint from a perspective of which a virtual-reality (VR) depth map has been generated;
   for a given pixel in the VR depth map, find an optical depth (D) of a corresponding pixel in the real-world depth map;
   determine a lower bound (D−D1) for the given pixel, by subtracting a first predefined value (D1) from the optical depth (D) of the corresponding pixel in the real-world depth map;
   determine an upper bound (D+D2) for the given pixel, by adding a second predefined value (D2) to the optical depth (D) of the corresponding pixel in the real-world depth map;
   re-map an optical depth of the given pixel fetched from the VR depth map, from a scale of the lower bound to the upper bound determined for the given pixel to another scale of A to B, wherein A and B are scalars;
   encode re-mapped optical depths of pixels of the VR depth map into an encoded depth map; and
   send the encoded depth map to the at least one display apparatus.

9. The system of claim 8, wherein the optical depth of the given pixel is re-mapped to:
   B, if the optical depth of the given pixel is larger than the upper bound,
   A, if the optical depth of the given pixel is smaller than the lower bound.

10. The system of claim 8, wherein the optical depth of the given pixel is re-mapped in a non-linear manner.

11. The system of claim 10, wherein if a transport channel employed for encoding the re-mapped optical depths enables representing optical depths in N discrete steps, a size of a discrete step that is in a proximity of the optical depth (D) of the corresponding pixel in the real-world depth map is smaller than a size of another discrete step that is in a proximity of the lower bound or the upper bound.

12. The system of claim 10, wherein the first predefined value (D1) is increased to adjust the lower bound.

13. The system of claim 8, wherein values lying between X and Y are left unutilised within the other scale of A to B during the step of re-mapping, wherein X and Y are scalars, wherein:
   when the optical depth of the given pixel is smaller than and within a third predefined range from the optical depth (D) of the corresponding pixel in the real-world depth map, the optical depth of the given pixel is re-mapped to X,
   when the optical depth of the given pixel is larger than and within a fourth predefined range from the optical depth (D) of the corresponding pixel in the real-world depth map, the optical depth of the given pixel is re-mapped to Y.

14. The system of claim 8, wherein the encoded depth map is sent via an alpha channel, when A is equal to 0 and B is equal to 1.

15. A method for decoding, implemented by at least one display apparatus, the method comprising:
   receiving an encoded depth map from at least one server;
   decoding the encoded depth map into re-mapped optical depths of pixels of a virtual-reality (VR) depth map;
   obtaining a real-world depth map corresponding to a viewpoint from a perspective of which the VR depth map has been generated;
   for a given pixel in the VR depth map, finding an optical depth (D) of a corresponding pixel in the real-world depth map;
   determining a lower bound (D−D1) for the given pixel, by subtracting a first predefined value (D1) from the optical depth (D) of the corresponding pixel in the real-world depth map;
   determining an upper bound (D+D2) for the given pixel, by adding a second predefined value (D2) to the optical depth (D) of the corresponding pixel in the real-world depth map;
   reverse-mapping a re-mapped optical depth of the given pixel of the VR depth map, from a scale of A to B to another scale of the lower bound to the upper bound determined for the given pixel, wherein A and B are scalars; and
   determining, based on the optical depth of the corresponding pixel of the real-world depth map and the other scale of the lower bound to the upper bound, at least one of: the re-mapped optical depth of the given pixel of the VR depth map, whether the given pixel occludes or is occluded by the corresponding pixel.

* * * * *